E. MONTI.
APPARATUS FOR CONCENTRATING SOLUTIONS BY FREEZING.
APPLICATION FILED MAR. 20, 1907.
955,659.
Patented Apr. 19, 1910.
6 SHEETS—SHEET 2.
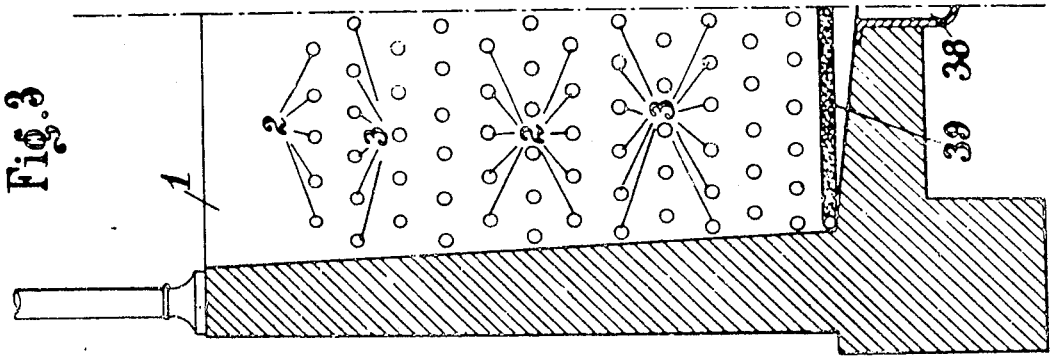
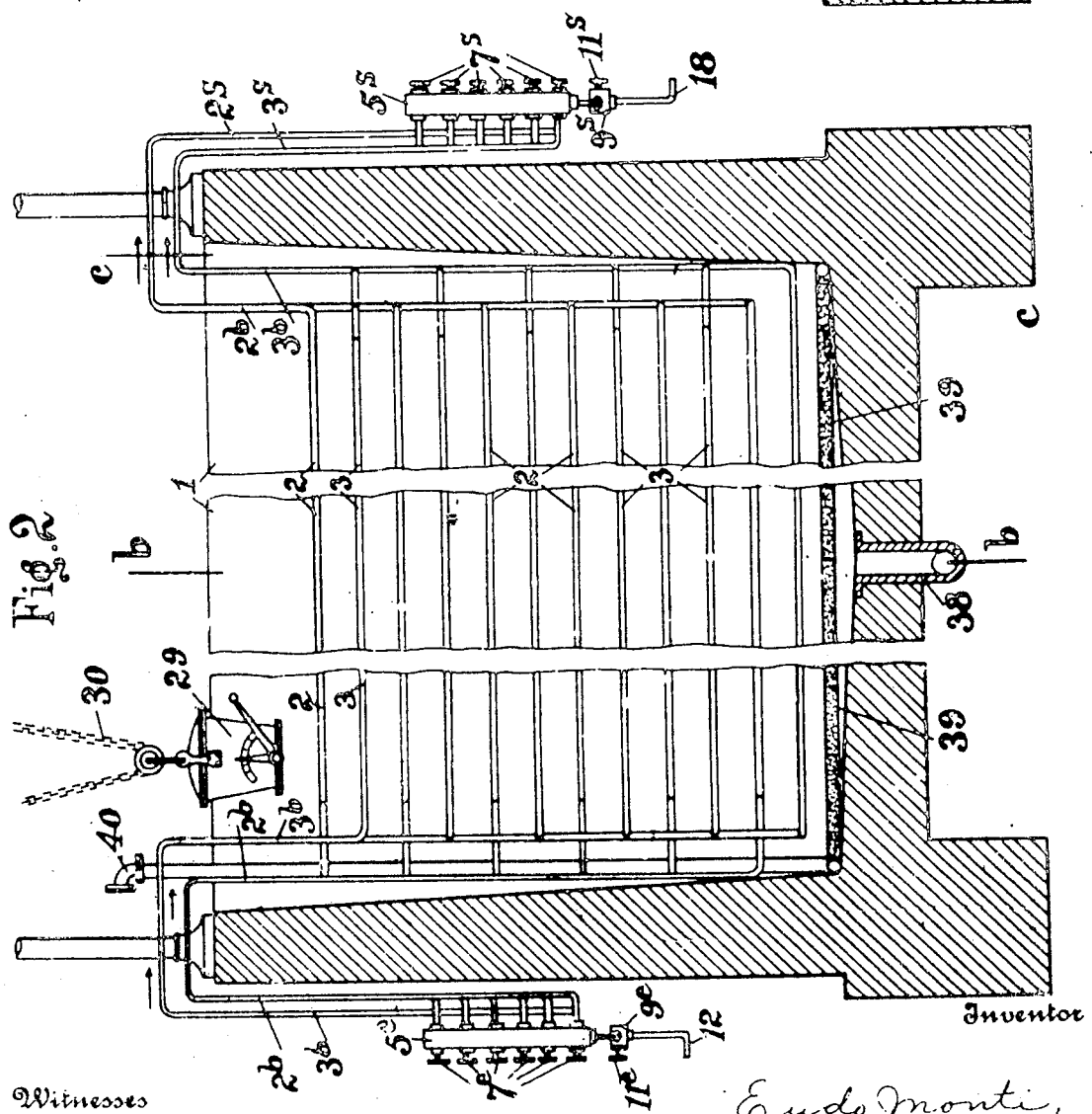

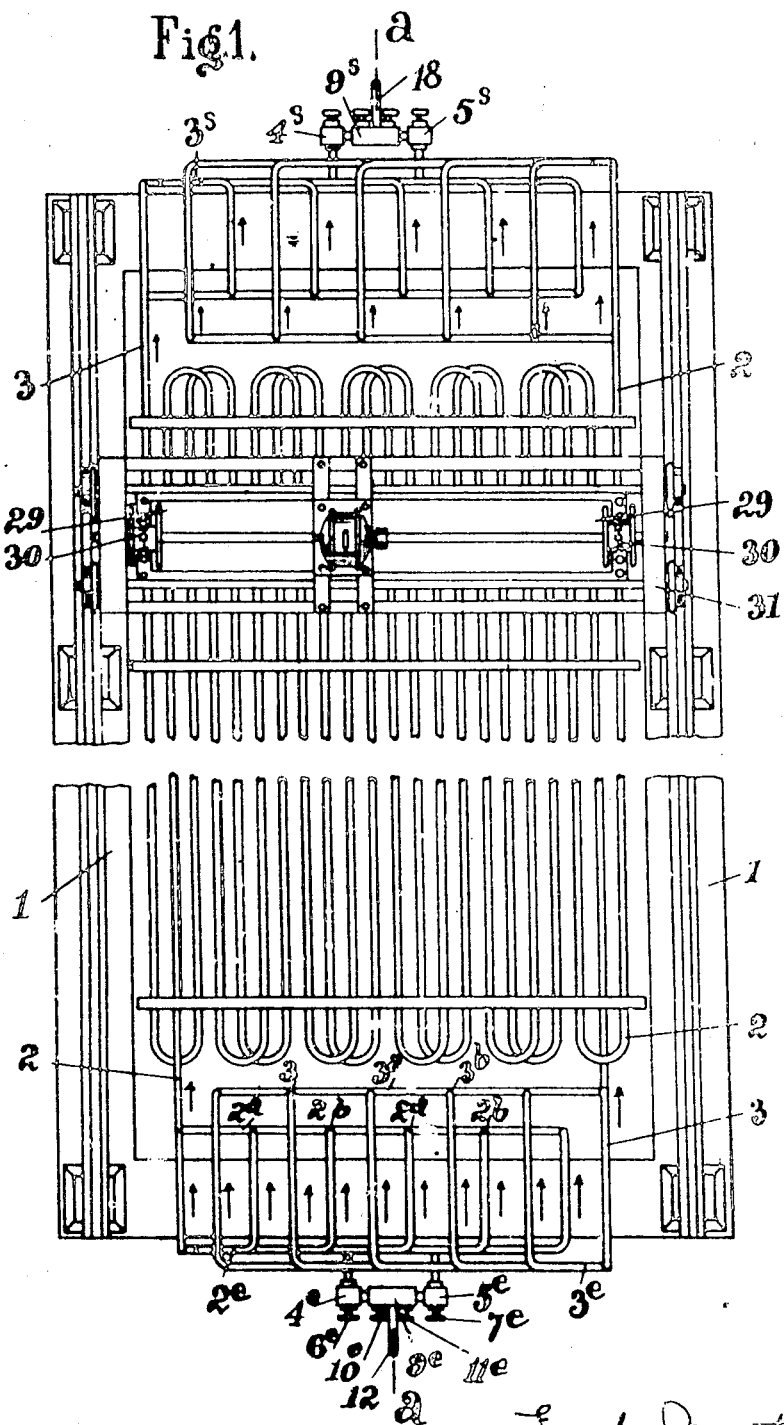

E. MONTI.
APPARATUS FOR CONCENTRATING SOLUTIONS BY FREEZING.
APPLICATION FILED MAR. 20, 1907.
955,659.
Patented Apr. 19, 1910.
6 SHEETS—SHEET 3.
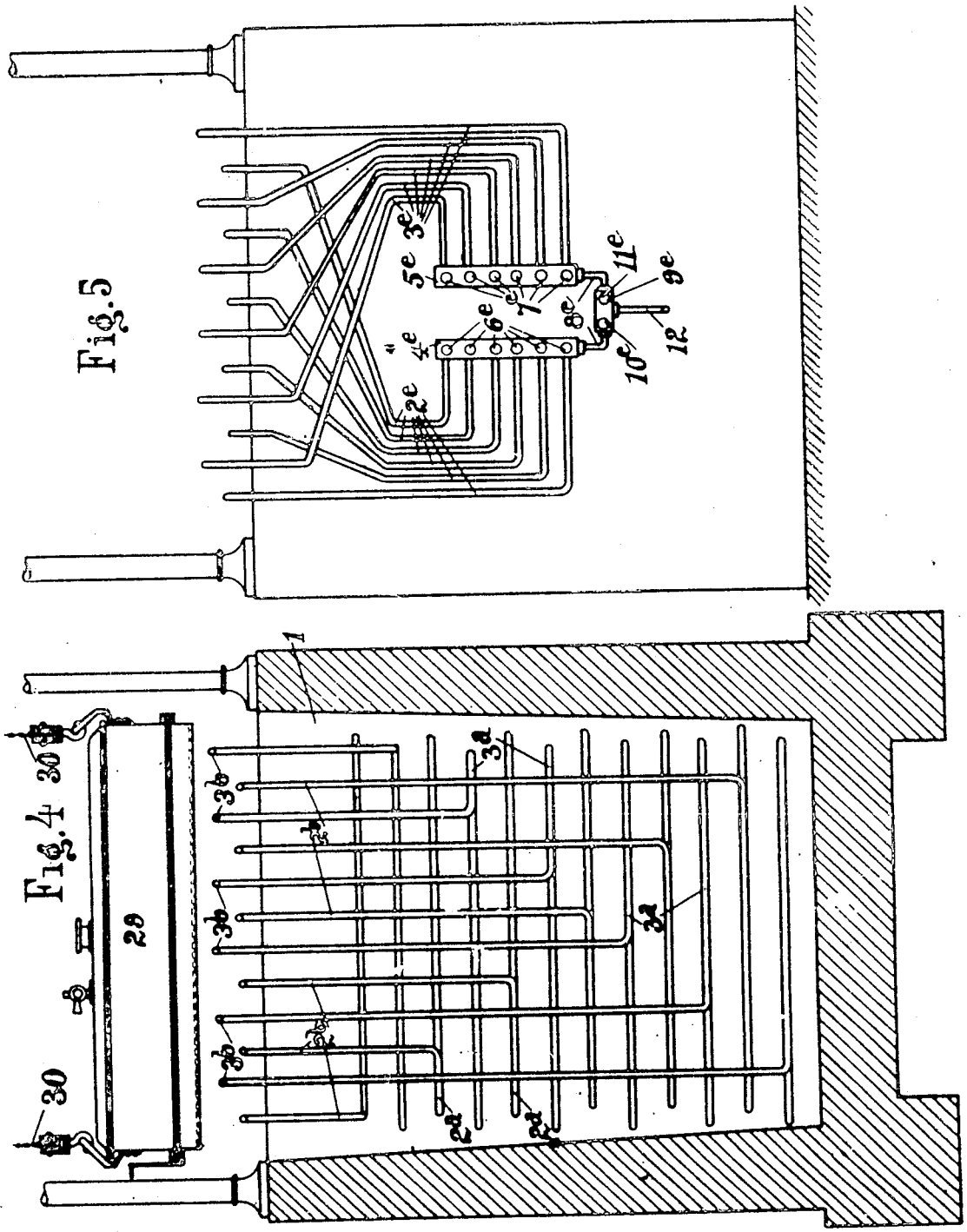
Witnesses
T. Fitzhugh Knox.
J. W. Vynkoop.
Inventor:
Eudo Monti.
By Knight Bros
Attorney

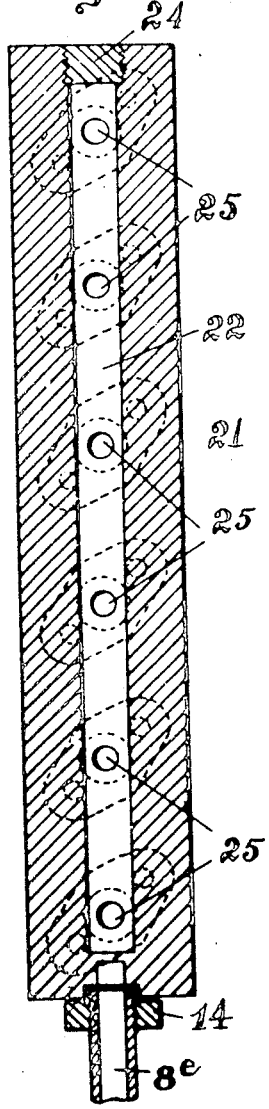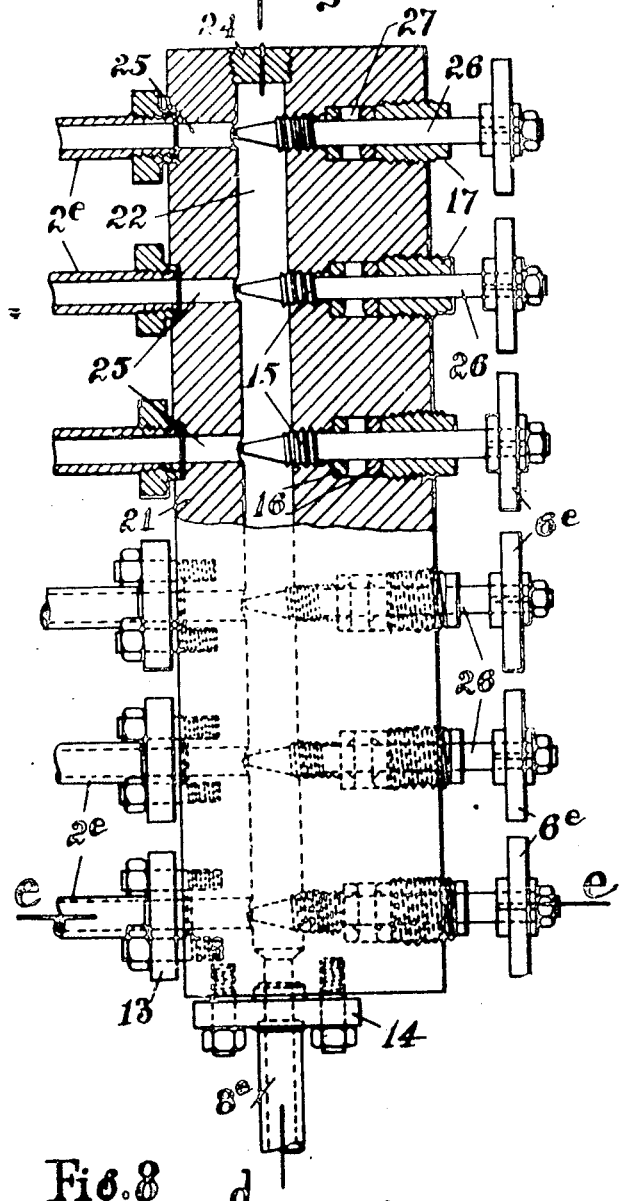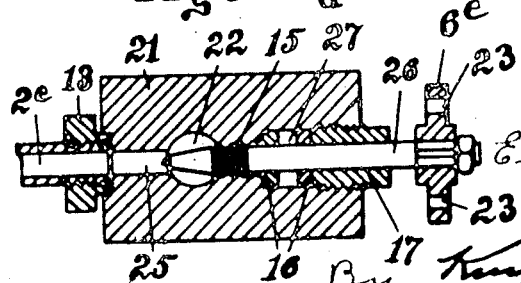

E. MONTI.
APPARATUS FOR CONCENTRATING SOLUTIONS BY FREEZING.
APPLICATION FILED MAR. 20, 1907.
955,659. Patented Apr. 19, 1910.
6 SHEETS—SHEET 5.
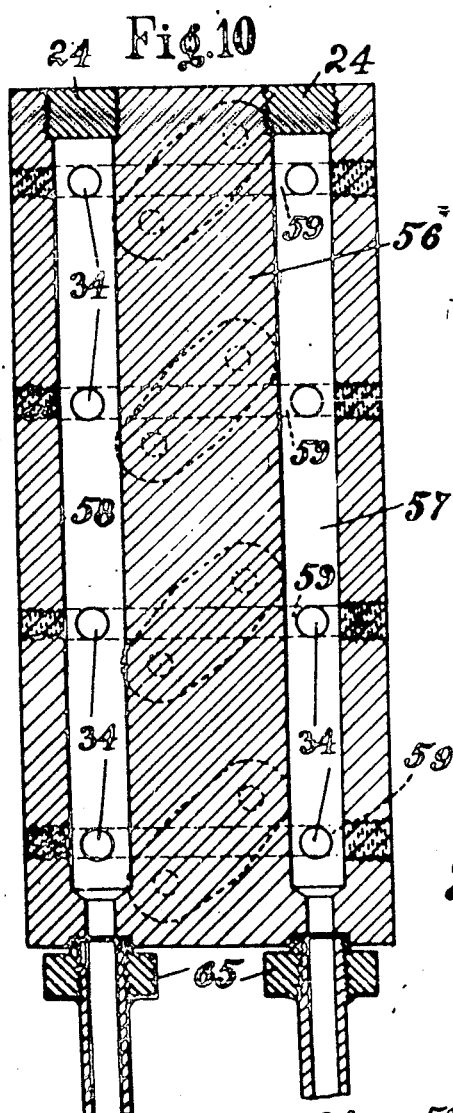
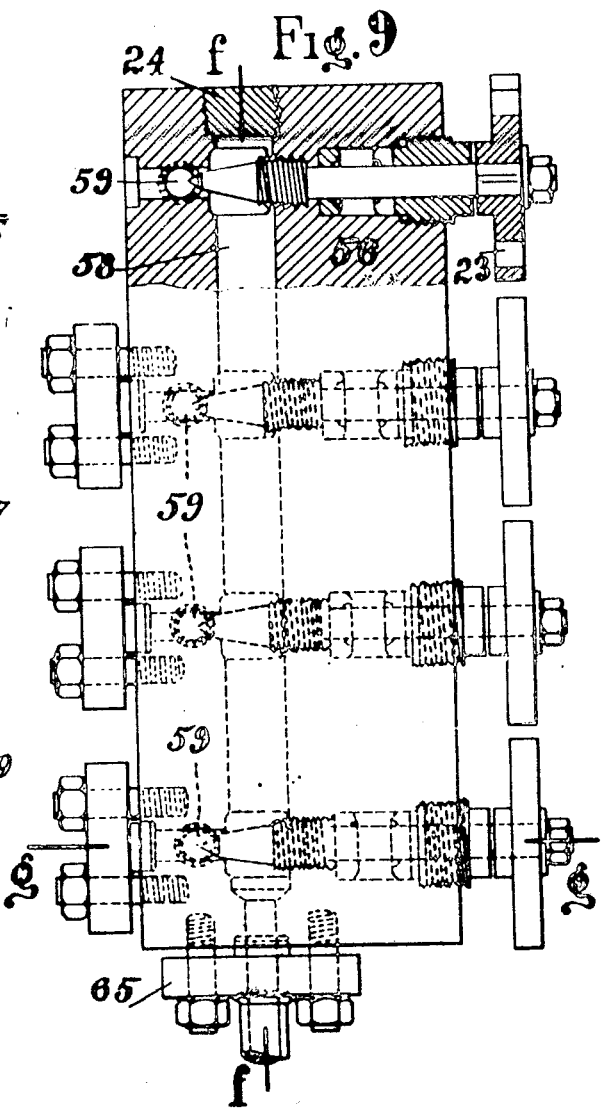
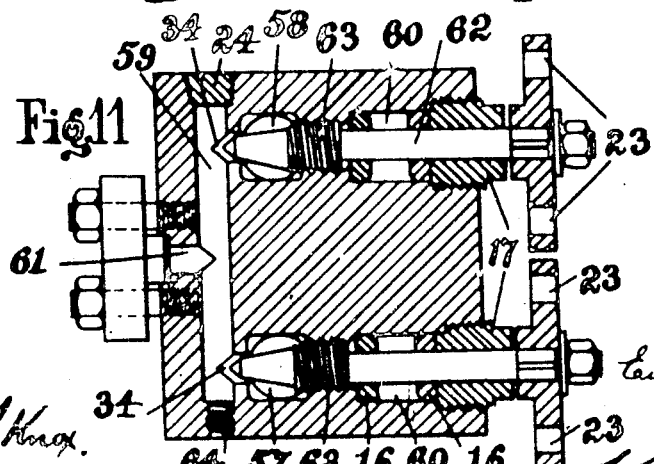

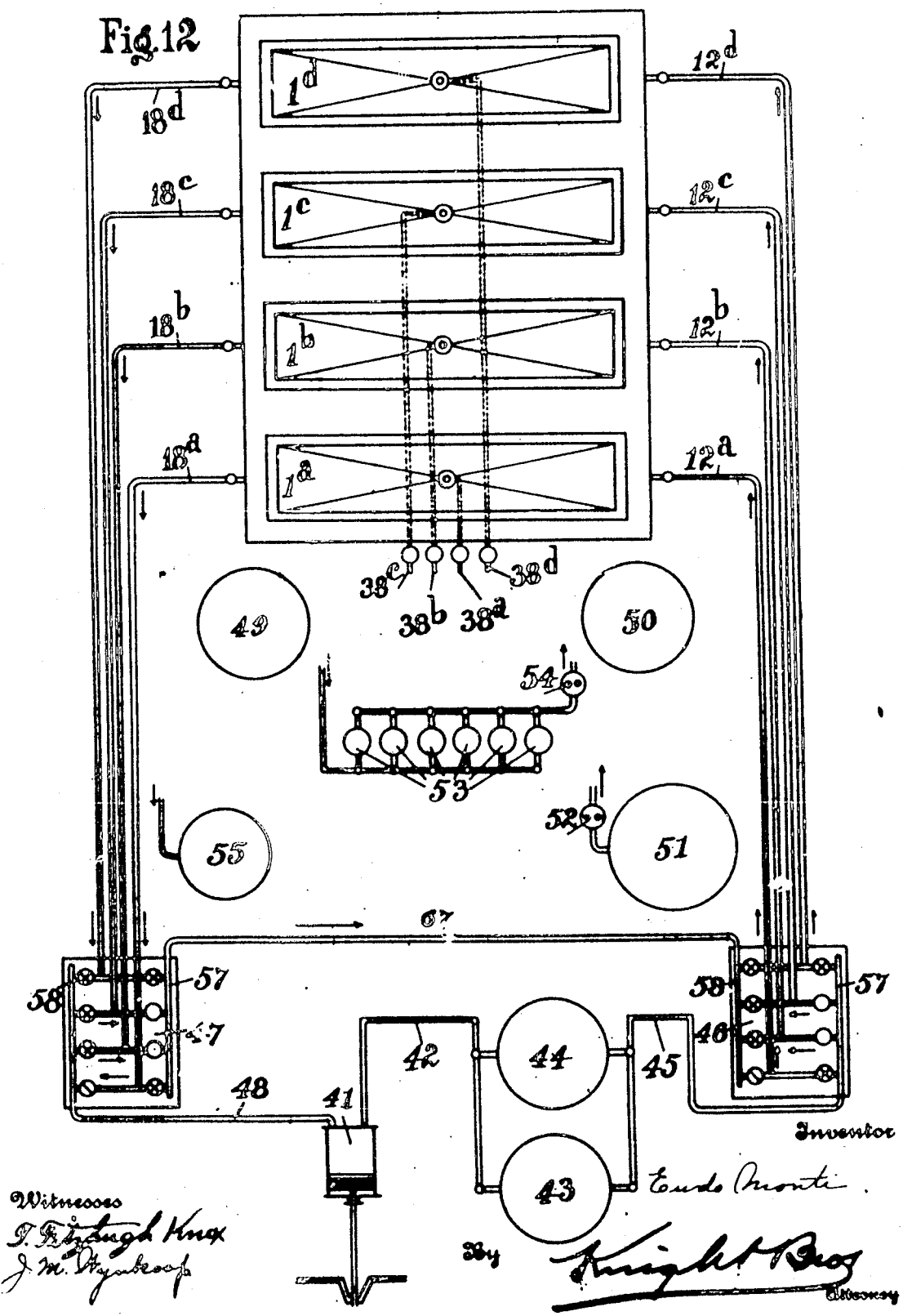

UNITED STATES PATENT OFFICE.

EUDO MONTI, OF TURIN, ITALY.

APPARATUS FOR CONCENTRATING SOLUTIONS BY FREEZING.

955,659.  Specification of Letters Patent. Patented Apr. 19, 1910.

Application filed March 20, 1907. Serial No. 363,528.

*To all whom it may concern:*

Be it known that I, EUDO MONTI, a subject of the King of Italy, and resident of Turin, Italy, have invented certain new and useful improvements in apparatus for concentrating solutions by freezing and systematically displacing the soluble substances from the ice-crystals, of which the following is a specification.

The present invention has for its object some improvements in the apparatus for concentrating solutions by freezing as protected by my prior Patent No. 761,387 dated May 31st 1904 also by my patent application No. 285936 filed November 4th 1905, in which apparatus the cooling and the freezing of the solution to be concentrated are effected by direct expansion of a compressed cooled and liquefied gas in pipes immersed in the solution to be concentrated. Said apparatus allows the operator to obtain with the same consumption of energy a much lower temperature than by the circulation of refrigerated brine and is therefore to be preferred for concentrating solutions whose freezing point is originally low or for reconcentrating solutions already concentrated by means of apparatus in which refrigerated brine is used.

The most important improvements consist substantially: 1. In the shape and structure of the freezing tanks which though of a very large size may be constructed of reinforced concrete, wooden planks coated with tar or other cheap materials to suit circumstances and the nature of the solution to be concentrated. 2. In the use of electrically welded or otherwise soldered straight iron, steel or copper pipes, varnished or coated with tar, tinned or galvanized as required by the nature of the solution to be concentrated as hereinafter described, the result being to obtain the even congelation of large quantities of solutions by means of very extensive exchanging surfaces at the lowest cost.

The present improvements consist further in the use, in combination with the concentrating apparatus hereinafter described, of the arrangement described and claimed in my co-pending patent application, Ser. No. 363,527, permitting me to obtain, during the displacement, a regular and even spraying of the frozen mass with the more and more diluted displacing solutions and furthermore allowing eventually the displacement to take place in an atmosphere of an inert gas heavier than air.

Another improvement consists further in the peculiar arrangement and make of the distributing cocks and valves allowing me to regulate easily the pressure of the gas evaporating in the different ranges of pipes, also to alternate in the same pipes the evaporation of the cooled liquefied gas under controllable pressure with the circulation of the still lukewarm compressed gas coming from the condenser as hereinafter described.

Another of the present improvements consists in the general arrangement of the apparatus in the case of an installation comprising several freezing tanks, in such a way as to fully utilize the heat-absorption occasioned by melting of the ice separated by a previous operation, for the further cooling of the already liquefied gas coming from the condenser, or for the preliminary refrigeration of the solution to be concentrated or of the displacing solution.

Another improvement consists in the application to the direct expansion apparatus of means allowing the circulation of warm gas in the freezing pipes in order to soften the hard ice coating on said pipes before operating the displacement as already described and claimed in my application No. 363,527, while the melting of the denudated ice is occasioned by means of cool water, which after having been cooled to about its freezing point is used in an interchanger either to cool the lukewarm condensed gas coming from the condenser or to cool the solutions to be frozen in another tank or the displacing solutions if necessary.

In the annexed drawings I have shown some constructional forms of my apparatus and a complete plant comprising a battery of freezing tanks.

Figure 1 is a plan view of a freezing tank; Fig. 2 is a vertical longitudinal section of line --a.a-- of Fig. 1; Fig. 3 is a vertical cross section of the tank left half on line --b.b-- of Fig. 2; Fig. 4 is a vertical cross section of the tank on line --c.c-- of Fig. 2; Fig. 5 is an end view of the tank; Fig. 6 is a partially sectioned side view of a distributer of the gas under pressure to the tank tube batteries in order to control the gas expansion; Fig. 7 is a longitudinal section of said distributer on line —d.d— of Fig. 6. Fig. 8 is a cross section of same on line —e.e— of Fig. 6; Fig. 9 is a side view partially sectioned of a collector of the gas distribution to the different tanks of a plant. Fig. 10 is a longitudinal section on line —f.f— of Fig. 9. Fig. 11 is a cross section on same line —g.g— of Fig. 9. Fig. 12 is a plan diagrammatic view of a plant of a battery of four freezing tanks fed by a single compressor.

The freezing tank —1— (Figs. 1-5) is of reinforced concrete or any other suitable material. Inside the tank, longitudinally arranged in horizontal planes are a large number of straight metallic tubes —2.3—, of steel or other suitable material, and varnished or coated inside and outside with tar or other suitable material. The tubes —2.3— are curved at their ends and soldered together in the same plane electrically or in any other suitable way, so that they unite many single tubes —2.3— or plane coils made up of straight tubes arranged in as many horizontal planes, (Fig. 2.) The tubes —2.3— constituting as a whole the plane coils —2.3— of the different planes are disposed one to another in groups as represented in Fig. 3. In the plane coils —2.3— formed by the straight tubes, and which are advantageously substituted for the freezing coils spirally coiled which were used in the apparatus described in my prior applications Nos. 223919 and 285936, the expansion of the gas coming from the compressor is effected.

In order to obtain an even congelation of the liquid mass held in the tank, the tubes or plane coils —2.3— are arranged as follows: The inlet ends of the coils —2— are situated on the left side at the front end of the tank (see the lower left hand portion of Fig. 1) while the outlet ends of the same coils are on the right side at the back end of said tank, (see the upper right hand portion of Fig. 1) on the contrary for the coils —3—, arranged in an equal number of planes intermediate between the planes of the coils —2—, the inlet ends are on the right side, of the front end of the tank, while their outlet ends terminate at the back end of the tank, on the left side. Owing to this arrangement, the flow of the refrigerating gas in the planes of coils —2— and —3—, go from left to right for the coils —2— and vice-versa from right to left for the coils —3—. In this way an even refrigeration of the mass to be frozen contained in the tank is evidently obtained everywhere. In order to obtain an even refrigeration even at the tank ends where the coil ends come out, said ends are arranged in such a way as to obtain the most uniform arrangement of the tubes. Said arrangement is shown in Figs. 1, 2 in plan and side view respectively and in end view in Fig. 4, in which has been illustrated the manner in which the inlet ends of coils —2.3— are arranged. The ends of coils —2—, inside the tank, are bent horizontally at —2ᵃ— and then vertically at —2ᵇ—, so that the parts —2ᵇ— be equally distant from one another and arranged in the same plane; in the same way the ends of coils —3— are bent horizontally at —3ᵃ—, then vertically at —3ᵇ—, so that the parts —3ᵇ— are also equally distant and in the same plane, different from that in which are disposed the parts —2ᵇ— (Figs. 1, 2.) In a similar manner are arranged the outlet ends of coils —2.3— at the other end of the tank. It will be understood that this arrangement has been described only by way of example and that it may be varied according to want. The ends of coils —2.3— come outside the tank and their inlet branches —2ᶜ— and —3ᶜ— respectively are disposed at the outside on the front face of the tank as illustrated in Fig. 5. The other outlet branches —2ᵉ.3ᵉ— are disposed on the other face, the back one, of the tank in a similar way as illustrated in Fig. 5. The branches —2ᶜ— —3ᶜ— terminate separately in two distributers —4ᶜ—5ᶜ—, the construction of which will be hereafter explained, said distributers are provided with cocks —6ᶜ.7ᶜ— controlling the gas expansion in each plane coil —2— or —3—. The two distributers are connected by means of tubes —8ᶜ— with a single distributer —9ᶜ—, into which goes the inlet pipe —12— from the source of the compressed gas; said distributer —9ᶜ—, by means of its cocks —10ᶜ.11ᶜ— and tubes —8ᶜ— permits the connection of one or the other of the distributers —4ᶜ.5ᶜ— or both at a time with the tube —12—. In a similar way the outlet branches —2ᵉ.3ᵉ— at the other tank end terminate in two collectors —4ᵉ.5ᵉ— similar to —4ᶜ.5ᶜ— which are provided with controlling cocks —6ᵉ.7ᵉ—, connected with a single collector —9ᵉ— from which starts the discharging tube —18— (Figs. 1, 2.)

A constructional form of the distributers —4ᶜ.5ᶜ— or collectors —4ᵉ.5ᵉ— is illustrated by way of example in Figs. 6, 7, 8. Each apparatus consists of a massive square bar —21— of steel or other suitable material, in which is bored a channel —22— with which connects the inlet pipe —8ᶜ— for the compressed gas or the discharge pipe —8ᵉ— for the expanded gas; this pipe is connected with the massive block by means of a bridle —14— and the channel —22— is closed at its other end by means of a copper stopper —24—, screwed to the block and hammered. In the block and perpendicularly to the channel —22— are bored short holes —25— communicating with said channel —22—; connecting with said pipes are the inlet ends —2ᶜ— or —3ᶜ— or the outlet ends —2ᵉ— or —3ᵉ— of the freezing coils; said ends are connected with the block —21— by means of bridles. The openings between the holes —25— and the hole —22— is regulated or stopped by means of cocks (6ᵃ.7ᵃ or 6ᵇ.7ᵇ) provided with stems —26— extending through packing spaces —27— and actuated from the outside by means of a suitable key, introduced into the holes —23— in the plates —6ᵃ.7ᵃ— or —6ᵇ.7ᵇ— rigidly secured to the outside ends of the stems —26—. These stems are threaded at their lower part for a certain length whereby they are adapted to be screwed into the contracted threaded portion of the packing space —27—. The inner end of stem —26— is beveled and when the stem is fully screwed in, closes the opening between the holes —22.25—. Suitable packings —16— insure a tight fitting of the collector at the side of stems —26—, these latter being guided by the threaded stoppers —17— which are mounted in the block 21 by means of the threaded outer portions of the packing spaces 27.

By means of the collectors above described it is evidently possible, by manipulating the cocks, to control the expansion in the different freezing pipes, so that the required temperature may be obtained in correspondence with each layer of pipes.

It is obvious that the collector above described, which is provided with six cocks corresponding to the six tubes leading to the coils, may have any number of cocks according to the number of tubes ending in the collector, and this according to circumstances of the case. If for instance the distributer —9ᵃ— or collector —9ᵃ— (Figs. 1, 2, 5) is of the same type as that described, it has only two stem cocks —10ᵃ.11ᵃ— and —10ᵃ.11ᵃ— respectively, by means of which the distributers —4ᵃ.5ᵃ—leading the gas to the coils or the collectors 4ᵃ.5ᵃ— receiving the gas from the coils may be placed in or out of circuit.

The above described collectors, which can undergo strong pressure owing to their solid construction, are particularly advantageous in the case, in which the refrigeration is effected by means of the direct expansion of a compressed gas, especially when the gas is dry carbonic acid, as in this case the whole of the apparatus is submitted to very strong pressures.

It appears from the aforesaid that owing to the arrangement of the freezing pipes and the cocks in the distributers which terminate the coils of the tank, it is possible to control as desired the freezing process of the mass to be frozen.

When the freezing process is over, I begin the displacement as described in my Patent No. 761387, that is by sprinkling the frozen mass with the displacing solutions obtained in a previous operation. In order to obtain an even sprinkling of the frozen mass and to effect eventually the displacement in an atmosphere of an inert or reducing gas heavier than air, I employ here a reservoir —29— supported by chains —30— by means of a traveling crane —31— similar to that described and illustrated in my pending application No. 363,527 or I employ any other form of sprinkling apparatus, suitable for the purpose of discharging the liquid evenly on the surface of the frozen mass. The solutions drawn from the frozen mass under the displacing operation are collected on the bottom of tank —1—, sloping toward the tube —38— serving successively for the dripping of the concentrated solutions and of the diluted solutions dripping afterward from the frozen mass, and lastly of the melting water of the ice left in the tank.

Around the bottom of the tank —1— on the inside, is arranged a tube —39— in which is bored a number of holes, which tube projecting from the tank at —40— serves for the injection of an inert or reducing gas, for instance dry carbonic acid or the like into the mass being frozen, for the purpose of increasing the volume and permeability of the frozen mass when desired.

The plan shown in Fig. 12 will now be described. The same includes four freezing tanks —1ᵃ.1ᵇ.1ᶜ.1ᵈ—. —41— is the compressor whose outlet pipe —42— is connected with the two condensers —43.44— which may be used both at a time, by connecting them either in series or in parallel, or separately. In the condenser —43— the usual cooling water is caused to circulate, while in the condenser —44— the water drawn from the melting ice circulates. The refrigerated gas coming from the condenser or condensers reaches the distributer —46— through the tube —45—. The distributer, constructed as hereinafter described, controls the expansion of the gas by means of its piping and cocks and insures the proper distribution of the gas to the coils of the different tanks. The gas is delivered to the coils of the tanks through the tubes —12ᵃ.12ᵇ.12ᶜ.12ᵈ— goes through the batteries of coils and by means of the tubes —18ᵃ.18ᵈ— is conveyed into the collector —47— similar to the distributer —46— from which through the suction pipe —48— it goes back to compressor —41—. —49— is a reservoir for the cold water at 0° drawn from the melting ice left in the tanks, said water being discharged by the outlet tubes —38ᵃ.38ᵈ— of the tanks. —50— is an interchanger, in which the solution to be concentrated drawn from the reservoir —51— by means of the pump —52— is caused to circulate in counter-current with cold water, for instance the water of reservoir —19— before introducing it in the tanks, or the displacing solutions drawn from the tanks —53— by means of the pumps —54— before effecting the displacement. —55— is the reservoir of the concentrated solution.

It will be seen that the time necessary for displacing by osmosis the interposed solutions from the ice crystals being a function of the viscosity of the solution and of the percentage of ice separated in each operation, while the time necessary for the congelation is also a function of the ratio between the volume of the solution to be frozen and the exchanging surface; also of the distance of the tubes from one another and of the difference between the gas evaporation temperature and the temperature of the solution, it is always possible to reduce to two the number of freezing tanks by controlling them in such a manner that the congelation is effected in a time equal to that required for all the displacing and ice melting operations, plus that required by the operations preceeding the freezing, while if the congelation is operated quickly a larger number of tanks will be necessary. I remark however that a quick congelation does not produce a crystallized mass easily and evenly permeable to the liquids.

Before describing how the above described plant works, the construction of the collectors —46,47— must be explained. Figs. 9, 10, 11 show a constructional form of the same. This collector, similar to that of Figs. 6 to 8 can support the highest pressure; it consists of a massive square bar —56— of forged steel, inside of which are bored lengthwise two holes —57,58— then the four holes —59— perpendicular to the holes —57,58—. In addition, eight holes —60— are provided perpendicularly to the holes —57,58,59—; and short holes —61— (Fig. 11) connect the holes 59 with the outside. The latter connect through the holes —34— the two inner holes —57,58—. Said communication of the two pipes —57,58— with one another is therefore opened or closed by means of the eight cocks —62— arranged in the holes —60— and actuated from the outside in a similar manner to those of Figs. 6, 7, 8. The stems —62— are threaded on their lower ends 63 and thereby adapted to be screwed into the threaded portion of the hole —60—. The inner ends of the stems —62— are beveled so that when fully screwed in, the openings between the pipes —57,58— and 59 are closed. Suitable packings —16— insure here as in the other constructional form above described, a tight fit around the stems. Said stems are guided within a suitably threaded cap —17—. A plug —24— of copper, is screwed in and sealed by hammering thus serving to close on one side the holes —57,58,59—; the holes 59 may be closed also at the other end —64— by means of a similar plug or may, as shown in Fig. 11, be threaded for receiving a tube leading to a manometer. To the pipes —57,58— are connected by means of bridles —65— the gas inlet and outlet pipes, while to the pipes —64— are connected by means of similar bridles —66— the tubes leading to or from the coil batteries in the tanks.

By the above described arrangement of the collectors in the plant of Fig. 12, the working of the same will be easily understood, as well as the modifications to be made when said collectors are to be used for a plant having a different number of tanks. In said plant, the two collectors are mounted as illustrated, that is the pipe —57— of collector —46—, from which the tubes —12ª,12ᵈ— lead to the coil batteries of the tanks, is connected with the tube —45—, while the pipe —58— of the other collector —47— to which lead the tubes —18ª,18ᵈ— coming from the freezing batteries of the tanks, is connected with the tubes —48—; moreover the free pipes —58— and —57— of the two collectors —46,47— respectively are connected one to another by means of the tube —67—. In Fig. 12 the cocks have been shown diagrammatically by circles. The cocks represented by a circle crossed by two lines are supposed to be closed, those crossed by a single line are controlled for gas expansion, those represented with the circle only are wide open.

In order to give an example of the way in which the apparatus works, I suppose that tank —1ª— is being frozen; tank —1ᵇ— is already frozen and the displacement is going on; tank —1ᶜ— where the displacement has already been effected contains the mass of ice crystals left after the displacement is over and is being filled with cool water to melt said ice; tank —1ᵈ— is ready for being filled with a fresh quantity of solution to be concentrated. In the coils immersed in tank —1ª—, in which the congelation is going on, the gas coming from the compressor is evaporated. In the tank —1ᵇ— in which the congelation has been achieved and the dripping of the more concentrated solution is over, I soften the layer of ice coating the freezing pipes before commencing the displacement, as described in my pending patent application Ser. No. 363,527; for this purpose it is convenient to cause the fluid to pass through the pipes in tank —1ᵇ— before evaporating it in the tubes running through tank —1ª—; in this way the heat absorbed by the ice layer coating the tubes are utilized for further cooling the gas before its expansion. For the same purpose the gas may also be caused to pass before its expansion through the coils of tank —1ᶜ— in which the ice left after the displacement is contained. It is however more convenient to melt said ice with a sufficient quantity of water as cold as possible in order to obtain the greatest possible quantity of water cooled to 0°, which is caused to circulate in an interchanger, through which runs in an opposite direction the condensed gas going from the condenser to the coils of that freezing tank which is in turn acting as an evaporator. The cocks of the distributers —46.47— are arranged for obtaining this circulation, that is to say the gas pushed by the compressor passes through the tube —42— across the condenser or condensers through the tube —45— and pipe —57— of —46— and through the open cocks of this latter passes into the tubes —12ᵇ.12ᶜ—, runs through the coils immersed in tanks —1ᵇ.1ᶜ— and through the tubes —18ᵇ.18ᶜ— and the open cocks of —47— reaches —57—, whence through the tube —67— reaches the pipe —58— of —46— and through the cock of this latter controlled for the expansion passes through the tube —12ᵃ—, expands in the coils of —a¹—, comes back through —18ᵃ— to the collector —47— and through the cock of this latter, comes back to the compressor through —58— and —48—.

From the above description it will be understood how the position of the cocks of collectors —46.47— should be changed for effecting the expansion of the gas in the coils of another tank or for employing the hard ice coating the pipes of another tank for further cooling the compressed gas before its expansion.

The displacement in tank —1ᵇ—, the melting of the ice in tank —1ᶜ— by means of a suitable quantity of refrigerating water and the charge of fresh solutions in —1ᵈ— are effected exactly in the same way as described in my patent application No. 363,527.

Having thus described the invention, what I claim as new therein, and desire to secure by Letters Patent is:—

1. An apparatus for concentrating solutions by freezing comprising a rectangular freezing tank or basin of suitable material, straight tubes constituting the exchanging surface said tubes being arranged longitudinally in the tank in horizontal ranges, with the pipes of each horizontal range connected in such manner as to form flat coils having the coils of the odd ranges beginning on the left side of the tank and ending on the right and those of the even ranges beginning on the right and ending on the left; collectors provided with controlling cocks and having the ends of said coils connected therewith; a perforated tube arranged in the tank bottom and extending to the outside, through which reducing gas is injected into the frozen mass; and a sprinkling device for effecting the displacement of the concentrated solution interposed through the ice crystals.

2. In an apparatus for concentrating solutions by freezing, the combination with the freezing tanks provided with tubes arranged longitudinally therein; of collectors at the ends of the tank connected with said longitudinal tubes, each of said collectors consisting of an integral block provided with vertically arranged gas-inlet and outlet pipes; a plurality of gas-distributing cocks for controlling the flow of gas therethrough; and cross channels connecting the gas-inlet and outlet pipes.

3. In a direct expansion freezing and concentrating plant, the combination of a plurality of freezing tanks provided with coils; a plurality of interchangers and reservoirs; an ice machine connected therewith by means of pipes controlled by cocks; distributers for controlling the circulation of gas independently in each of said coils; a compressor for delivering gas under pressure to said distributers; a reservoir for the water from the melting ice left in the tank after the displacement is over; an interchanger for cooling the solutions to be concentrated or for the displacing solutions, a battery of two condensers for the gas coming from the compressor, one being adapted to be supplied with the ordinary refrigerating water, the other with water cooled to 0°, and means whereby the coils in one or more of said tanks, may act as refrigerators for the compressed gas coming from the condenser.

4. In combination with an apparatus of the character described, a collector constructed of a forged steel block or bar and provided within with longitudinal channels connecting on the outside with a gas-inlet and a gas-outlet pipe; a plurality of tanks provided with a plurality of coils connecting with said collector; cross-pipes between said gas-inlet and gas-outlet channels and a pair of cocks for each cross-channel whereby the size of the opening between said longitudinal and said cross-pipe may be controlled at will.

5. In an apparatus for concentrating solutions by freezing, the combination of a freezing tank; tubes arranged longitudinally therein in horizontal ranges to form a plurality of flat coils, said coils being formed to provide inlets and outlets arranged in vertical planes at the ends of the tank; and collectors provided with cocks for controlling the flow through said inlets and outlets.

The foregoing specification signed at Turin, Kingdom of Italy, this 19th day of February, 1907.

EUDO MONTI.

In presence of—
VITALI SALVATORE,
ANGE DE REGALCÉ.